Figure 1:
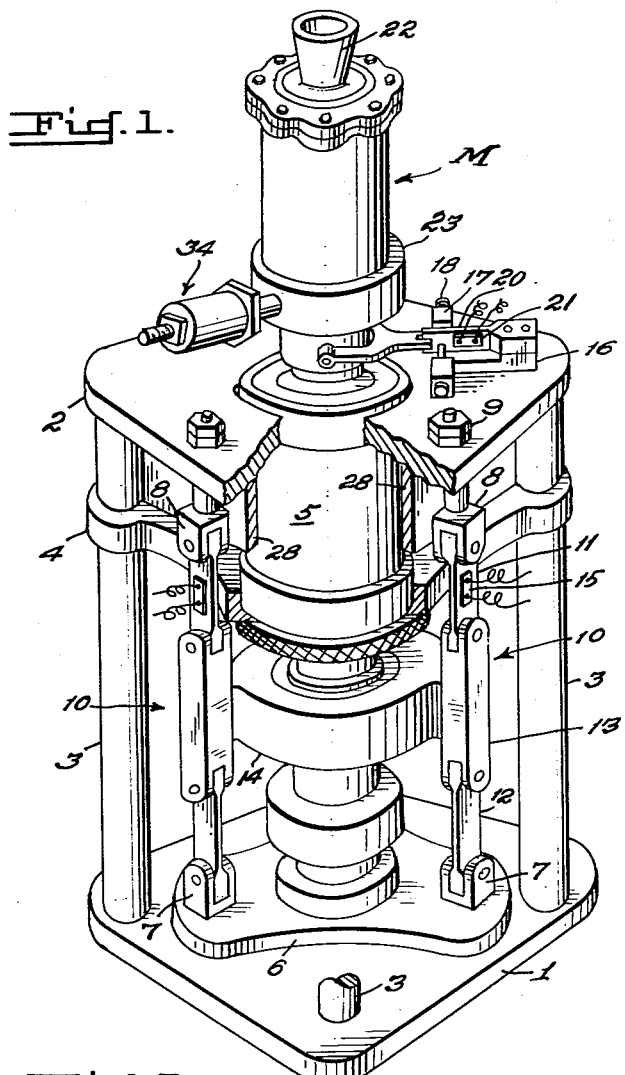

Sept. 20, 1960 P. ROSENBERG 2,953,019
STATIC THRUST STAND
Filed July 31, 1958 2 Sheets-Sheet 1

INVENTOR.
Philip Rosenberg
BY
W. E. Thibodeau, A. J. Dupont
& E. R. Mackert

Sept. 20, 1960  P. ROSENBERG  2,953,019
STATIC THRUST STAND
Filed July 31, 1958  2 Sheets-Sheet 2
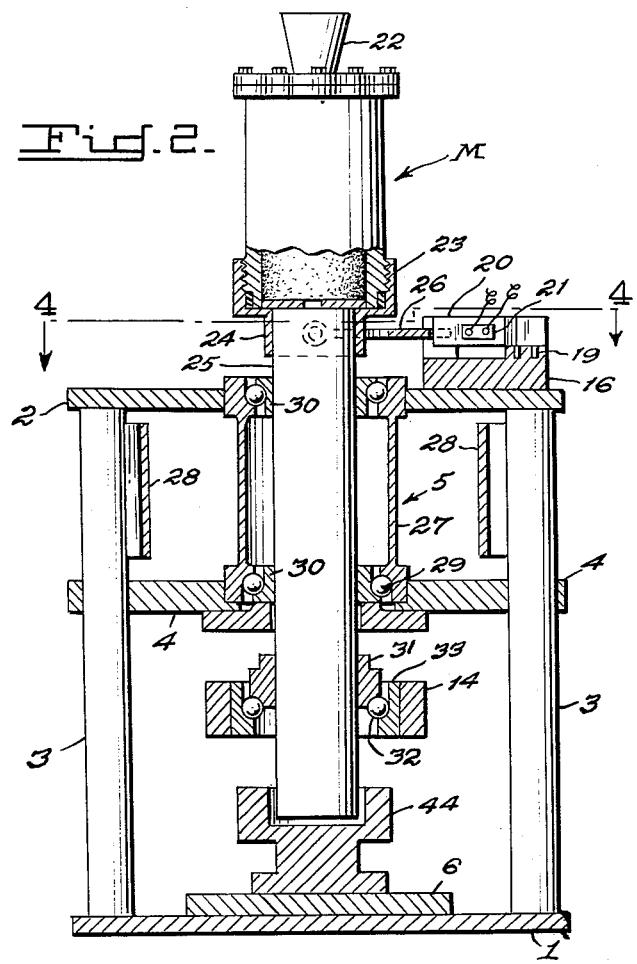
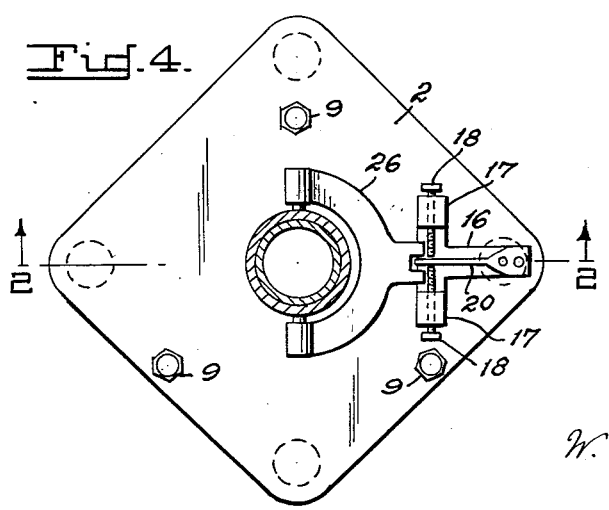
INVENTOR.
Philip Rosenberg
BY
W. E. Thibodeau, A. J. Dupont
& E. R. Mackert United States Patent Office 2,953,019
Patented Sept. 20, 1960

2,953,019
STATIC THRUST STAND

Philip Rosenberg, Highland Park, Ill., assignor to the United States of America as represented by the Secretary of the Army Filed July 31, 1958, Ser. No. 752,389

10 Claims. (Cl. 73—116)

This invention relates to a static thrust stand and more particularly to a static thrust stand for measuring the thrust, torque and internal pressure generated by a rocket motor.

In the production of rocket-assist projectiles it is necessary that the exact characteristics of the rocket motor be known; i.e. the thrust, torque and internal pressure as functions of time. The necessity for this is obvious if the exact flight characteristics are to be predeterminable.

To determine these characteristics the rocket motor to be tested is mounted on a thrust stand by means of an adaptor base which transmits the thrust to a shaft supported by three columns. The strain in the columns is proportional to the thrust applied and is measured by the use of resistance strain gauges. The adaptor base also contacts a small cantilever beam and a strain gauge on the beam is used to measure the rocket motor torque. The adaptor base is drilled so that a pressure gauge may be attached to measure the gas pressure inside the rocket motor.

It is, therefore, an object of this invention to provide a static test stand for measuring the thrust and torque developed and the internal pressure generated in a rocket motor.

A further object of the invention is to provide a test stand having a plurality of columns provided with strain gauges to measure the axial thrust of a rocket motor, a cantilever beam provided with a strain gauge to measure the torque force of the rocket motor and an adaptor plate having for mounting the rocket motor and being provided with a pressure gauge for measuring the internal pressure in the motor.

These and other objects will become more apparent when reference is had to the detailed description below.

Figure 3:
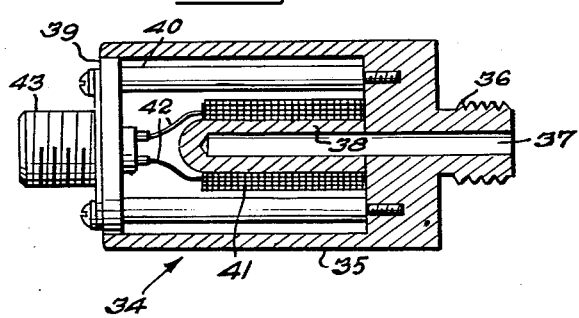

In the drawings:

Figure 1 is a perspective view partly in section of the static thrust stand of this invention, Figure 2 is a sectional view taken on the line 2—2 of Figure 4, Figure 3 is a sectional view of the pressure gauge, and Figure 4 is a sectional view taken on the line 4—4 of Figure 2.

Referring to the drawings and particularly to Figures 1 and 2 the test stand comprises a lower support or base plate 1 and a spaced parallel upper plate 2. These plates are joined together to form a rigid unit by four vertical posts 3 which may be welded or otherwise rigidly connected to the plates 1, 2. Also rigidly secured to the posts 3 is the spider 4 which acts as a support for the radial bearing designated in its entirety by reference character 5 which will be more fully discussed later in the specification.

The plate 1 has affixed thereto the base member 6 which carries three equi-angularly spaced lugs 7. Rigidly attached to the upper plate 2 are three studs connected by the nuts 9 and carrying three lugs 8 in vertical alignment with the lugs 7.

The means for measuring the axial thrust of the rocket includes three vertical columns indicated in their entirety by reference character 10. Each column is made up of a pair of upper and lower straps 11 and 12, respectively, which are in turn connected to the upper and lower lugs 8 and 7 carried by the rigid frame and a center member 13 connected to the straps and formed integral with the thrust bearing housing 14. Each upper strap member carries a pair of resistance strain gauges 15, one on each face of the strap.

The means for measuring the torque of the rocket motor includes a base plate 16 rigidly attached to top plate 2. See particularly Figure 4. Integral with the base plate 16 is a pair of blocks 17 which carry adjusting screws 18 the purpose of which will hereinafter appear. Rigidly attached to the base plate 16 by any suitable means such as studs 19 is a cantilever beam 20 and attached to this cantilever beam is a resistance strain gauge 21.

The rocket motor to be tested is indicated by the letter M and has the upwardly projecting thrust nozzle 22. The motor is carried by the adaptor base 23 into which the motor is threaded. The adaptor base carries a socket 24 on its lower end into which is fitted and secured the upper end of thrust shaft 25. The socket 24 also has connected thereto the torque plate 26 which is forked at its outer end to straddle the cantilever beam 20. Thus it will be seen that any torque created by the motor M will be transmitted to the adaptor base 23 and in turn through the plate 26 to the cantilever beam 20. The deflection of the cantilever beam is limited by the adjusting screws 18 to protect the beam against excess bending.

The shaft 25 is accurately aligned in parallelism with the columns 10 by means of the radial bearing 5. This bearing consists of an outer housing 27 which is mounted in an aperture in the upper plate 2 and is carried by the spider 4. The housing is also connected to the posts 3 by webs 28. This housing 27 forms the outer race for upper and lower ball bearings 29. The shaft 25 is slidably carried by the inner races of the bearings. Thus the bearing 5 accurately aligns the shaft 25 with the columns 10, but permits the shaft to have free axial movement. Rigidly connected to a lower portion of the shaft is a thrust collar 31 forming the inner race of thrust bearing 32. The outer race 33 of the thrust bearing is rigidly united with housing 14 which is in turn connected to the columns 10. Thus, the thrust from motor M is transmitted through shaft 25 and housing 14 to the columns 10.

The base member 6 is provided with an anvil 44 spaced from the lower end of shaft 25. In the event of excessive thrust by the motor M the shaft will contact the anvil and prevent the straps 11, 12 from being overstrained and receiving a permanent set.

The adaptor base 23 has a threaded aperture therein which communicates with the rocket motor chamber. Into this aperture is threaded a pressure gauge indicated in its entirety by reference character 34. The gauge is shown in detail in Figure 3 and consists of a body 35 having threads 36 for engagement with the adaptor base 23 and an internal passage 37 which receives pressure from the motor chamber. The body is formed with the elongated portion 38 which is subject to strain due to the internal pressure provided in passage 37 by the motor. An end plate 39 is provided on the gauge housing and is connected to the housing by studs 40. Resistance wire 41 is connected to housing portion 38 and lead wires 42 are led out through a nipple in the end plate.

Each of the resistance wire strain gauges 15, 21 and 34 is connected to form one arm of an electrical bridge. The unbalance of the bridge during the test is amplified and applied to the plates of an oscilloscope. The oscilloscope readings and time readings are recorded by any suitable means during the test, such as by photographing, so that the thrust, torque and internal pressure of the rocket motor can be calculated as a function of time.

*Operation*

In operation the rocket motor to be tested is mounted on the adaptor base 23 of the test stand. The motor is fired and thus produces axial thrust downwardly on the shaft 25 and a torque force acting about the axis of shaft 25. The axial thrust is transmitted through the thrust bearing 14 to columns 10. The strain produced in these columns is proportional to the axial thrust and this strain is measured by the use of resistance wire strain gauges 15. The torque produced by the motor provides a force tending to rotate the shaft 25 about its axis. The adaptor base 23 carries the torque plate 26 which operates on the cantilever beam 20. This beam carries resistance wire strain gauge 21 which is used to measure the rocket motor torque. The adaptor base also carries resistance wire pressure gauge 34 which is used to measure the rocket motor internal pressure. The signals from all of the strain gauges are fed to indicating and/or recording apparatus and the desired characteristics of the rocket motor can then be determined as a function of time.

Since variations in the specific embodiment which has been described may be made within the spirit and scope of this invention, the detailed description is not to be considered as limitative except in the light of the appended claims.

Having now described the invention, what is claimed as new and is desired to be covered by Letters Patent is:

1. A static thrust stand for measuring the thrust, torque and internal pressure of a rocket motor comprising a rigid support structure containing spaced apart parallel end plates separated by a plurality of rigid rod members, a vertical shaft journaled in said support and having an adaptor base provided with an aperture mounted at one end of said shaft to receive the rocket motor to be tested, said adaptor base adapted for mounting a pressure gauge communicating with the interior of the motor through said aperture, said shaft movable axially to measure the thrust applied to said shaft by the motor, and means connected to said support structure for measuring the torque applied to said shaft by the motor.

2. A static thrust stand comprising upper and lower members rigidly joined together to form a rigid support, a vertically disposed shaft journalled in said support and adapted to receive the thrust to be measured, a thrust bearing rigidly attached to and carried by said shaft, at least one articulated column comprising a plurality of arms carried by said rigid support and connected to said thrust bearing, a strain gauge carried by one arm of said articulated column to measure the amount of strain produced in the column by the thrust applied to said shaft.

3. A static thrust stand as set forth in claim 2 and further including a cantilever beam carried by said support, a torque plate carried by said shaft and engageable with said cantilever beam so as to flex it, and a strain gauge mounted on said cantilever beam to measure the amount of strain produced therein by torque applied to said shaft.

4. A static thrust stand as set forth in claim 2, said articulated column comprising upper and lower aligned straps connected to said upper and lower members, respectively, and also connected to said thrust bearing.

5. Means for measuring the thrust produced by a rocket motor or the like comprising spaced parallel plates, a plurality of posts connecting said plates and forming a rigid support, a shaft journalled in said support and adapted to carry the motor to be tested, a thrust member carried by said shaft and rigidly connected thereto, a plurality of columns connected to said support and being parallel to said shaft, said columns being connected to said thrust member to receive thrust from said shaft and strain gauge means connected to each column to measure the strain produced in said columns by the application of thrust from said shaft.

6. Means for measuring thrust as set forth in claim 5 further including means for measuring the torque produced by the motor, said means comprising a cantilever beam rigidly secured to one of said plates, a torque plate mounted on said shaft and engageable with said cantilever beam to deflect same as a result of torque applied to said shaft and a strain gauge mounted on said cantilever beam.

7. Apparatus as set forth in claim 6 further comprising oppositely disposed adjusting means carried by one of said plates and positioned on opposite sides of said cantilever beam to adjustably limit the deflection of said beam.

8. Means for measuring thrust as set forth in claim 5 and further including an anvil carried by said support, said anvil being aligned with and spaced from the end of said shaft to limit axial movement of said shaft and prevent excessive strain in said columns.

9. Rocket motor testing apparatus comprising in combination a rigid frame including parallel end plate members, a rotatable shaft, means mounting said rotatable shaft for axial sliding movement in said frame, a thrust member rigidly attached to and carried by said shaft, a plurality of columns parallel to said shaft and connected to said frame and to said thrust member, axial thrust of said shaft inducing strain in said columns, means on said columns for measuring the strain induced therein, an adaptor base connected to said shaft and adapted to mount a motor to be tested, a pressure measuring device mounted upon said adaptor base for communication with the interior of the motor to be tested.

10. Rocket motor testing apparatus as set forth in claim 9 further including a cantilever beam mounted on said frame, a torque plate carried by said adaptor base and engageable with said cantilever beam to deflect same upon motor torque induced rotation of said adaptor base and means on said cantilever beam for measuring the deflection thereof.

References Cited in the file of this patent

UNITED STATES PATENTS

| | | |
|---|---|---|
| 1,906,551 | De Forest | May 2, 1933 |
| 2,403,952 | Ruge | July 16, 1946 |
| 2,472,108 | Hickman | June 7, 1949 |
| 2,655,043 | Wolfe et al. | Oct. 13, 1953 |
| 2,790,322 | Grimes et al. | Apr. 30, 1957 |
| 2,844,027 | Davie | July 22, 1958 |